United States Patent [19]
Beltran et al.

[11] Patent Number: 5,139,738
[45] Date of Patent: Aug. 18, 1992

[54] CORROSION RESISTANT FILLER WELD ALLOYS

[75] Inventors: Adrian M. Beltran, Saratoga; James J. Frawley, Albany, both of N.Y.

[73] Assignee: General Electric Company, Schenectady, N.Y.

[21] Appl. No.: 629,567

[22] Filed: Dec. 18, 1990

[51] Int. Cl.$^5$ ............ C22C 19/07; C22C 30/00
[52] U.S. Cl. ............ 420/436; 420/439; 420/588; 219/146.22
[58] Field of Search .......... 420/436, 439, 588; 148/425; 219/146.22

[56] References Cited

U.S. PATENT DOCUMENTS

| | | | |
|---|---|---|---|
| 4,043,839 | 8/1977 | Hartline et al. | 148/203 |
| 5,002,731 | 3/1991 | Crook et al. | 420/588 |
| 5,066,459 | 11/1991 | Beltran et al. | 420/588 |

FOREIGN PATENT DOCUMENTS 60-224731  11/1985  Japan.
61-183432  8/1986  Japan.
63-084791  4/1988  Japan ............ 219/146.22

Primary Examiner—R. Dean
Assistant Examiner—Margery S. Phipps
Attorney, Agent, or Firm—Nixon & Vanderhye

[57] ABSTRACT

A corrosion resistant filler weld alloy is provided for use in repairing a preselected article alloy of predetermined composition range at a temperature equal to or greater than the incipient melting temperature of the article alloy, the filler weld alloy having a composition, by weight of:

Chromium—from about 20% to about 48%
Nickel—about 20%
Tungsten—from about 0% to about 4%
Carbon—about 0.1%
Silicon—about 0.9%
Manganese—about 0.6%
Tantalum—from about 0% to about 3.5%
Titanium—from about 1% to about 2.25%
Cobalt—Balance.

8 Claims, No Drawings

CORROSION RESISTANT FILLER WELD ALLOYS

BACKGROUND AND SUMMARY OF THE INVENTION

This invention relates to the repair of alloy articles and, more specifically, to a filler alloy composition for use in gas-tungsten-arc-welding (GTAW) or plasma-arc-welding (PAW) of cast gas turbine component alloys.

There are numerous cobalt based alloys used in both the manufacture and repair of high-temperature operating gas turbine engine components including combustors, turbine vanes, nozzles, etc.

Representative examples of cobalt base alloys for the production and/or repair of superalloy articles are disclosed in U.S. Pat. Nos. 4,830,934; 4,614,296; 4,396,577; 4,381,944; 4,285,459; 4,058,415; 3,355,287; 3,276,865; 3,271,140; and 3,260,505.

The principal method of repairing cast gas turbine nozzles which have experienced various forms of damage during many hours of service is that of GTAW or PAW deposition of a suitable filler alloy. Service-induced cracks, corrosion or foreign object damage are typically removed by grinding as a preparation for filler alloy deposition. In order to provide a maximum service-life repair interval, the filler alloy should exhibit tensile, rupture and fatigue strength as well as ductility comparable to the parent alloy, i.e., the article alloy being repaired. An equally important criteria is that the oxidation and hot corrosion (or sulfidation) resistance of the filler alloy be equivalent to, or at least closely approximate the parent alloy.

Two commercially available filler weld alloys for use in GTAW repairs of a cobalt-base parent alloy have compositions (by weight) as follows:

Commercial Filler Alloy No. 1

10 percent Ni;
20 percent Cr;
15 percent W;
0.1 percent C;
1.0 percent Si;
2.0 percent Mn; and
the balance cobalt.

Commercial Filler Alloy No. 2

20 percent Ni;
20 percent Cr;
0.1 percent C;
0.2 percent Si;
0.2 percent Mn;
7.5 percent Ta; and
the balance cobalt.

Since chromium is the single most important element for oxidation and corrosion resistance, and even with as much as 20 percent chromium, these commercially available alloys have proven to be less than completely satisfactory in terms of corrosion resistance.

The objective of this invention is to develop GTAW or PAW filler alloys with superior corrosion resistance and mechanical properties over the temperature range of approximately 1200° to 1900° F.

The cobalt base filler weld alloys of this invention are formulated to be compatible with at least one preselected, known gas turbine nozzle alloy (also referred to as the "parent" alloy) produced by the assignee of this invention under the name FSX-414, discussed further herein.

In accordance with one exemplary embodiment of the invention, GTAW/PAW filler alloys are provided in the form of a base wire or rod of approximately 0.030" to 0.150" diameter. As such, the alloys must exhibit sufficient ductility to permit fabrication in such form without sacrificing the high temperature strength or ductility of weld deposits subsequently made from the wire.

At the same time, it will be appreciated that the parent alloy is cast and does not lend itself to fabrication by forging, for example. Thus, the parent alloy itself is not suitable as a filler weld alloy for use in GTAW and PAW repairs. Thus, in comparision to the parent alloy compositions, the amount of Nickel has been increased and the amount of Carbon decreased to provide the desired degree of formability.

In accordance with one exemplary embodiment of the invention, a filler weld alloy is provided which comprises, by weight:

Chromium —from about 20% to about 40%
Nickel —from about 8% to about 22%
Tungsten —from about 0% to about 9%
Carbon —from about 0.03% to about 0.20%
Silicon —up to about 2%
Manganese —up to about 2%
Tantalum —from about 0% to about 4%
Titanium —from about 1% to about 3%
Hafnium —from about 0% to about 1%
Zirconium —from about 0% to about 1%;
Cobalt —Balance

DETAILED DESCRIPTION OF THE INVENTION

The filler weld alloys of this invention are designed for use in GTAW or PAW repairs of advanced superalloy articles such as gas turbine nozzles. More specifically, the alloys of this invention are formulated to be compatible with a current gas turbine stationary nozzle alloy, i.e., a Co-base superalloy, known as FSX-414 having a composition, by weight, as follows:

10 percent Ni;
29 percent Cr;
7 percent W;
0.25 percent C;
0.9 percent Si;
0.6 percent Mn; and
the balance cobalt.

The filler weld alloys of this invention, designed specifically for use with the above mentioned parent alloy generally have the following compositions, by weight:

Nickel —from about 8% to about 22%
Chromium —from about 20% to about 40%
Tungsten —from about 0% to about 9%
Carbon —from about 0.03% to about 0.20%
Silicon —up to about 28%
Manganese —up to about 2%
Tantalum —from about 0% to about 4%
Hafnium —from about 0% to about 1%
Zirconium —from about 0% to about 1%
Titanium —from about 0% to about 3%
Cobalt —Balance In terms of specific alloy compositions, the filler weld alloys of this invention are set out below in Table 1.

TABLE I

| Alloy | Co | Ni | Cr | W | C | Si | Mn | Ta | Hf | Zr | Ti |
|-------|-----|----|----|----|-----|-----|-----|-----|----|----|------|
| 1 | Bal. | 20 | 28 | 7 | 0.1 | 0.9 | 0.6 | 2 | — | — | — |
| 2 | Bal. | 18 | 26 | 3 | 0.1 | 0.1 | 0.1 | 1 | 1 | — | — |
| 3 | Bal. | 20 | 29 | 0 | 0.1 | 0.9 | 0.6 | 3 | — | — | — |
| 4 | Bal. | 20 | 29 | 3.5 | 0.1 | 0.6 | 0.2 | 3.5 | — | — | — |
| 5 | Bal. | 20 | 20 | — | 0.1 | 0.9 | 0.6 | 3.5 | — | — | 1 |
| 6 | Bal. | 20 | 28 | 4 | 0.1 | 0.9 | 0.6 | — | — | — | 2.25 |

Alloys 5 and 6 represent the presently preferred embodiments.

By increasing the Chromium content, (relative to the presently available commercial alloys) corrosion resistance is enhanced. At the same time, and relative to the parent alloy, increasing the amount of Nickel and decreasing the amount of Carbon increases the formability of the filler alloy. In order to achieve the desired formability characteristic for the filler alloy, without sacrificing the high temperature strength or ductility of the weld deposits made from the wire, a careful balancing of solid-solution strengtheners Tungsten and Carbon, carbide formers Titanium, Tantalum, Zirconium, Hafnium and Chromium; as well as the matrix elements Nickel and Cobalt is required.

With small adjustments in C content and the controlled additions of other strong MC-forming refractory elements such as Tantalum, Hafnium and Zirconium, the alloys of this invention also provide superior GTAW or PAW deposits for another advanced Co-base nozzle alloy, known as X-484 (which is the subject of allowed copending patent application Ser. No. 06/885,070, filed Jul. 14, 1986 and which is assigned to the same assignee as the present invention), having a composition, by weight, as follows:

10 percent Ni;
29 percent Cr;
7 percent W;
0.35 percent C;
0.015 percent B;
0.1 percent Si;
0.1 percent Mn;
1 percent Hf;
0.5 percent Ta;
0 5 percent Zr;
0.2 percent Ti; and
the balance Cobalt.

Thus, the present invention provides filler weld alloys for GTAW or PAW repair techniques which result in repaired regions having superior corrosion resistance and mechanical properties over a temperature range of from about 1200° to 1900° F., and having other characteristics comparable to those of the parent alloy or alloys.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filler alloy, for use in gas-tungsten-arc welding or plasma-arc-welding, consisting of:
Nickel —20%;
Chromium —20%;
Carbon —0.1%;
Silicon —0.9%;
Manganese —0.6%;
Tantalum —3.5%;
Titanium —1%;
Cobalt —Balance.

2. A filler alloy consisting of:
Nickel —20%;
Chromium —28%;
Tungsten —4%;
Carbon —0.1%;
Silicon —0.9%;
Manganese —0.6%;
Titanium —2.25%;
Cobalt —Balance.

3. A gas-tungsten-arc welding or plasma-arc-welding filler weld alloy comprising a length of wire having a diameter of from about 0.030 to about 0.150 inches and having a composition consisting of:
Nickel —20%;
Chromium —20%;
Carbon —0.1%;
Silicon —0.9%;
Manganese —0.6%;
Tantalum —3.5%;
Titanium —1%;
Cobalt —Balance.

4. A gas-tungsten-arc welding or plasma-arc-welding filler weld alloy comprising a length of wire having a diameter of from about 0.030 to about 0.150 inches and having a composition consisting of:
Nickel —20%;
Chromium —28%;
Tungsten —4%;
Carbon —0.1%;
Silicon —0.9%;
Manganese —0.6%;
Titanium —2.25%;
Cobalt —Balance.

5. A filler weld alloy corrosion resistant at temperatures of 1200°-1900° F. comprising a length of wire having a composition consisting of, by weight:
Nickel —20%;
Chromium —28%;
Tungsten —7%
Carbon —0.1%;
Silicon —0.9%;
Manganese —0.6%;
Tantalum —2%; and
Cobalt —Balance.

6. A filler weld alloy corrosion resistant at temperatures of 1200°-1900° F. comprising a length of wire having a composition consisting of, by weight:
Nickel —18%;
Chromium —26%;
Tungsten —3%;
Carbon —0.1%;
Silicon —0.1%;
Manganese —0.1%;
Tantalum —1%;
Hafnium —1%; and
Cobalt —Balance.

7. A filler weld alloy corrosion resistant at temperatures of 1200°-1900° F. comprising a wire having a composition consisting of, by weight:
Nickel —20%;
Chromium —29%;
Tungsten —0%;
Carbon —0.1%;

Silicon —0.9%;
Manganese —0.6%;
Tantalum —3.5%; and
Cobalt —Balance.

8. A filler weld alloy corrosion resistant at temperatures of 1200°–1900° F. comprising a length of wire having a composition consisting of, by weight:
Nickel —20%;
Chromium —29%;
Tungsten —3.5%;
Carbon —0.1%;
Silicon —0.9%;
Manganese —0.2%;
Tantalum —3.5%; and
Cobalt —Balance.

* * * * *